No. 852,934. PATENTED MAY 7, 1907.
O. G. DIEFENDORF.
BRICKMAKING MACHINE.
APPLICATION FILED JULY 14, 1906.
3 SHEETS—SHEET 1.
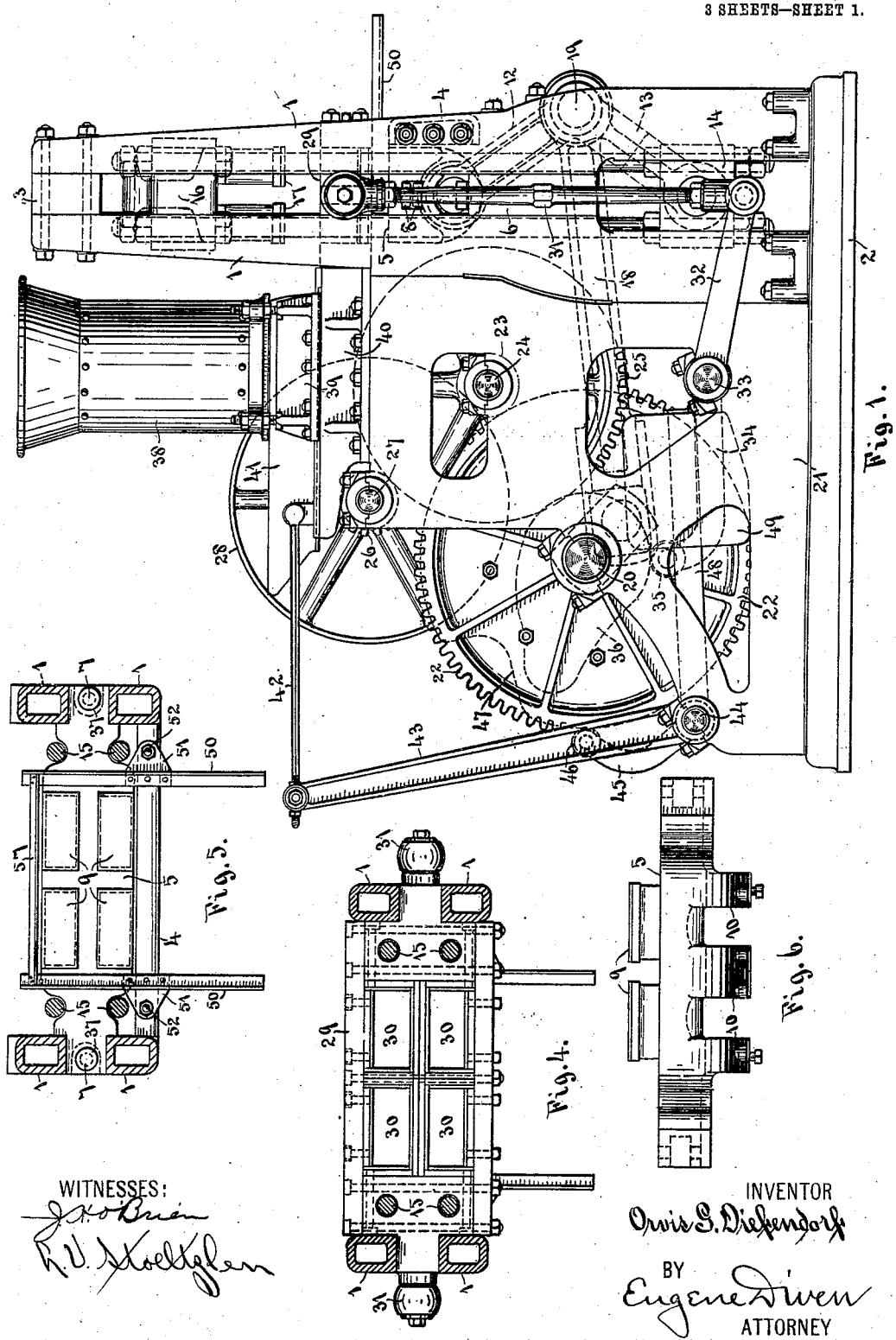
WITNESSES:
INVENTOR
Orvis G. Diefendorf
BY
Eugene Diven
ATTORNEY No. 852,934. PATENTED MAY 7, 1907.
O. G. DIEFENDORF.
BRICKMAKING MACHINE.
APPLICATION FILED JULY 14, 1906.
3 SHEETS—SHEET 2.
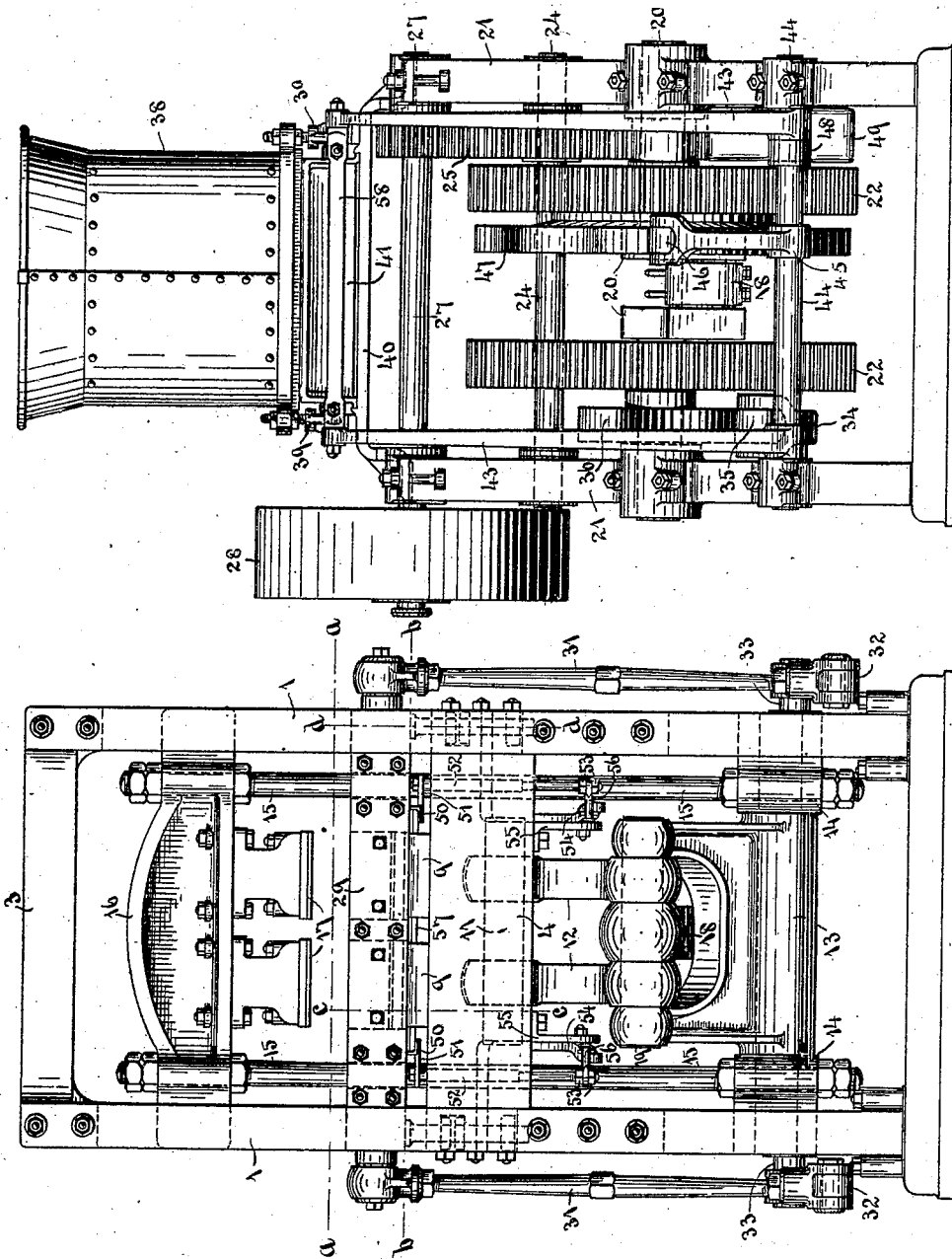
WITNESSES:
INVENTOR
Orvis G. Diefendorf
BY
Eugene Diven
ATTORNEY No. 852,934. PATENTED MAY 7, 1907.
O. G. DIEFENDORF.
BRICKMAKING MACHINE.
APPLICATION FILED JULY 14, 1906.
3 SHEETS—SHEET 3.
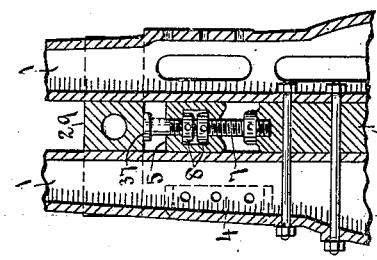
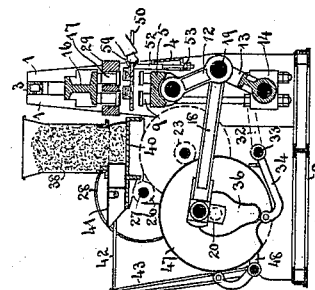
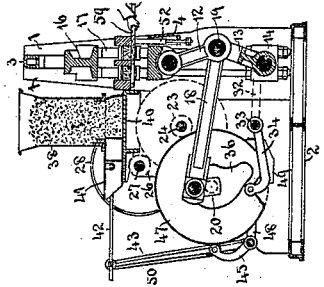
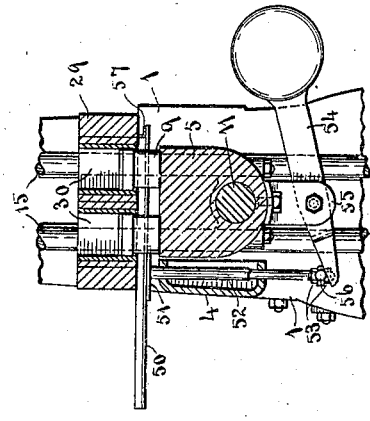
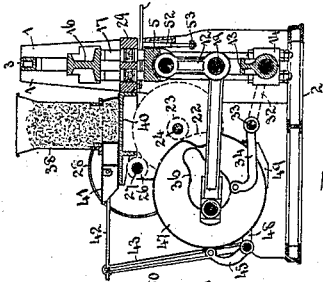
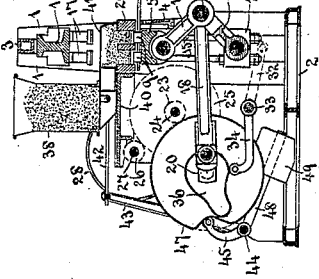
WITNESSES:
INVENTOR
Orvis G. Diefendorf
BY
Eugene Diven
ATTORNEY

UNITED STATES PATENT OFFICE.

ORVIS G. DIEFENDORF, OF WATERTOWN, NEW YORK.

BRICKMAKING-MACHINE.

No. 852,934.      Specification of Letters Patent.      Patented May 7, 1907.

Application filed July 14, 1906. Serial No. 326,250.

*To all whom it may concern:*

Be it known that I, ORVIS G. DIEFENDORF, a citizen of the United States, residing at Watertown, in the county of Jefferson and State of New York, have invented certain new and useful Improvements in Brickmaking-Machines, of which the following is a specification.

This invention relates to improvements in machines for making bricks, building blocks, and the like, from cement or other plastic mixtures, and has to do more particularly with machines for manufacturing such bricks and blocks in molds under pressure; my improved machine being especially adapted for carrying out the process of making bricks described in my Letters-Patent No. 766938, dated August 9, 1904.

One object of my invention is to provide a machine whereby the delivery of the bricks or blocks from the machine will be made from the bottom of the mold directly upon the pallet, or other conveying device, by which they are to be carried to the drying room or shed; from which pallet, or conveyer, they will not be removed until they are firmly set and hardened, thus insuring perfectly formed bricks, or blocks, with sharp, well defined edges and corners. In carrying out this part of my invention I provide a machine with a movable mold, so arranged as to rise from the bottom plungers at the same time with the top plungers to permit the insertion of the pallet directly below the mold, the mold being then given an upward travel faster than that of the top plungers, whereby the bricks will be delivered from the bottom of the mold directly upon the pallet, the pallet, together with the bricks resting thereupon, following the upward travel of the top plungers during this period of ejectment from the molds, whereby the bricks will be deposited upon the pallet without shock or abrasion and in perfect condition. By this arrangement I avoid all actual handling of the bricks until they are sufficiently set and hardened; thereby overcoming the fault in machines, as at present constructed, wherein the bricks, when delivered from the mold, must be transferred therefrom by sliding them upon the pallet.

A further object is to provide a machine which will be powerful enough to exert the pressure upon the bricks in the molds required in carrying out my aforesaid process, and which will withstand the strain of operating under such pressures; and, furthermore, to provide means for adjusting the machine parts to form bricks of any thickness and under any desired degree of compression.

I attain these objects by constructing and operating the machine and its parts substantially as illustrated in the accompanying drawings, in which—

Figure 1 represents a side elevation of the complete machine; Fig. 2, a front elevation; Fig. 3, a rear elevation; Fig. 4, a horizontal section of the forward portion of the machine on the line $a$—$a$ in Fig. 2; Fig. 5, a similar section on the line $b$—$b$ in Fig. 2; Fig 6, a detail showing a front elevation of the cross-block which carries the bottom plungers; Fig. 7, a detail showing a vertical section on the line $c$—$c$ in Fig. 2, looking to the left; Fig. 8, a detail showing a similar section on the line $d$—$d$ in Fig. 2; and Figs. 9 to 12, inclusive, diagrammatic views showing the machine in four stages of its operation.

Like numerals designate like parts in the several views.

The machine consists primarily of two standards, each composed of front and back guides 1, 1, secured at the bottom to a base 2 and fastened together at the top by the separating cross-piece 3. The standards are further fastened together by the cross brace or stiffener 4 bolted to the front guides in front of the stationary cross-block 5, which carries the bottom plungers 9. This cross-block 5 projects at each end between the front and back guides, where it rests upon the adjusting screws 7, which rise from the distance blocks 6 bolted between the guides at this point. By means of the nuts 8, which are provided with suitable spanner holes, the cross-block may be raised or lowered in position, as may be required by the thickness and degree of compression to be given to bricks or blocks to be produced in the mold.

In the hangers 10 formed on the underside of the cross-block 5, is mounted a shaft 11, from which are hung the two toggle struts 12, the lower ends of which are coupled to the double toggle arm 13 by means of a central toggle shaft 19. The toggle arm 13 is mounted to oscillate upon a shaft, the ends of which are fastened in the toggle blocks 14, said blocks being adapted to rise and fall in the guideways provided therefor at the lower portion of the standards. From these toggle blocks, pairs of tension rods 15 rise to the cross-head 16, which carries the top plungers 17. The toggle is operated by means of the connecting rod 18, which couples the center shaft 19 to a crank shaft 20, said crank shaft being mounted in journal boxes on the housing castings 21, which rise from the base 2 at the rear of the standards, to which said housings are also bolted. The crank shaft 20 is driven by means of two large gear wheels mounted thereon and meshing with pinions 23 secured to an intermediate shaft 24 mounted in the housings. This intermediate shaft is propelled by means of the gear wheel 25 which meshes with pinion 26 secured to the pulley shaft 27, said pulley shaft being provided at one side of the housings with the pulley 28 by which the machine is belted to the source of power. All these parts, as will be seen from an inspection of the drawings, are designed with a view to accomplishing a high degree of compression between the top and bottom plungers on the material deposited in the mold forms; the action of the toggle, when propelled by the crank shaft, causing the top plungers 17 carried by the cross-head 16 to descend into the mold, the bottom plungers carried by the cross-block 5 remaining stationary.

The mold 29 consists of a built up frame adapted, at the ends, to slide between the guides 1, and provided with forms 30 to receive the bottom and top plungers, into which forms said plungers fit closely. The faces of the plungers, and of the sides of the forms in the mold, will be formed of hardened steel plates, with their exposed surfaces ground smooth. These steel face plates will be made removable, in order that they may be changed, from time to time, as they are worn by the action of sand and other materials entering into the composition of the bricks or blocks; and the plungers will also be removably attached to the cross-block 9 and cross-head 16, in order that the machine may be altered, as desired, to construct different forms of bricks and blocks.

To operate the mold 29, action rods 31 are coupled to pins projecting from each end thereof beyond the standards, the lower ends of said rods being coupled to levers 32 keyed to the ends of the shaft 33, where it projects from the bearings on the housings 21. Between the housings, this mold shaft 32 is provided with a cam lever 34, which extends to the rear beneath the cam 36 mounted upon the crank shaft 20; the lever 34, where it engages said cam, being provided with a friction roller 35. The action of this cam upon the mold will be described hereinafter.

The mixture, from which the bricks or blocks are to be formed, is delivered into a hopper 38 mounted upon the stands 39 bolted at each side of the machine upon the top of the platen 40, which rests upon the top of the housings 21. Between the stands 39, the mold filler 41 is mounted to reciprocate upon the top of the platen, said platen being provided upon its top with suitable guide-ways to receive the filler. This mold filler, at its forward end, is provided with a bottomless compartment and, at its rearward end, with a top plate or shelf which acts as a bottom for the hopper, when the mold filler is moved to its forward position over the mold, as will be seen from an inspection of Fig. 9. The mold filler is operated by means of feed rods 42 coupled to each side thereof and to a reach rod 58, (see Fig. 3), which rod is coupled at its ends to the throw levers 43 attached to the feed shaft 44 mounted on the housings 21 at the rear of the machine. This feed shaft is provided with a lever 45, the free end of which engages the cam wheel 47 mounted upon the shaft 20, the end of said lever being provided with a friction roller 46 where it bears upon said cam wheel. This lever is held in contact with the cam wheel by means of a weight 49 carried upon the lever 48 keyed to shaft 44, and this weight is sufficiently heavy to transmit through lever 48 the power necessary to throw the mold filler into its forward position when the end of the feed lever rides into the recess formed on the cam wheel 47.

A support and guide for the pallet is provided below the mold 29, said support consisting of two horizontal angles 50 spaced apart sufficiently to clear the bottom plungers 9, (see Fig. 5), and mounted upon brackets 51 attached to the upper ends of vertical rods 52, which are adapted to reciprocate in guide-ways formed in the top and bottom flanges of the stiffener plate 4, the angles 50 being held in contact with the bottom of the mold by means of weighted levers 54 acting upon pins 56 projecting from washers secured upon the lower ends of the rods 52 by means of the nuts 53. The levers 54 are pivoted upon pins projecting from brackets 55 secured to the underside of the cross block 5, by the same set screws which secure the shaft 11 in the shaft hangers 10 formed thereon. At the rear, the angles 50 are fastened together by an angle cross brace 57 which also acts as a stop for the pallet.

The top face of the mold 29, when the mold is in its lowest position, registers with the top face of the platen 40, in order that the bottom face of the mold filler when thrown forward will pass from the platen directly upon the upper surface of the mold; and in order to prevent the mold from dropping below this registering position, I project the adjusting screws 7 above the cross-block 5 to form, at 37, rests which will receive the ends of the mold and prevent the descent thereof below the proper position. It will be understood that the adjusting screws 7 are fastened in fixed position at the upper ends of the distance blocks 6, being locked in such fixed position by jam nuts, when properly adjusted to stop the descent of the mold at the proper point.

The operation of the machine will be understood from an inspection of Figs. 9 to 12, inclusive, of the drawings. In Fig. 9 the mold filler is shown thrown forward over the mold to deposit the material for the bricks, such as moistened sand and cement, in case cement bricks are to be formed, in the mold forms, the mold being shown in its lowest position, and the cross-head 16 carrying the plungers 17 being shown in its uppermost position, to leave clearance for the forward travel of the mold filler. As the crank shaft 20 revolves from left to right, the mold filler will be drawn back to its rearward position to receive another charge from the hopper, this rearward motion being caused by the feed lever 45 riding out from the recess in cam wheel 47. As the shaft 20 continues to rotate, the toggle will be actuated by the connecting rod 18 to draw the cross-head downward, thereby forcing the plungers 17 into the mold forms and compressing the material therein to form the bricks to the desired thickness; the position of the machine parts, when the plungers 17 are at the bottom of their travel, being shown in Fig. 10. The continued revolution of the shaft 20 will cause the cross-head 16 to begin its upward travel, and, at the same time, the cam 36 will be brought into action upon the cam lever 34 to throw the mold upward, the mold and plungers 17 traveling upward together and carrying the compressed brick therewith until all have cleared the top of the bottom plungers 9, the pallet guides 50 rising at the same time in contact with the under-side of the mold. During this upward travel of the mold, the pallet is placed in position on the guides 50 and, as soon as the bottom plungers are cleared, it is pushed in beneath the mold until it strikes the stop 57. Fig. 11 shows the pallet in the act of being pushed into position beneath the mold. The cam 36 now acts upon the cam lever to increase the speed of the mold travel relatively to that of the top plungers, as they continue to travel upward, thereby causing the bricks to be pressed out of the mold forms and left resting upon the pallet. The pallet, carried by the guides 50, follows the up-travel of the bricks, until the bricks have been fully discharged from the mold forms by the plungers, after which the guides 50 will be brought to a stop, by reason of the nuts 53 on the lower ends of rods 52 striking against the bottom flange of the stiffener plate 4. The mold and top plungers continue to travel upward, thereby clearing the tops of the bricks and permitting them to be drawn out from beneath the mold on the pallet. This position of the machine parts is shown in Fig. 12, the pallet being therein shown partially removed from beneath the mold. The cam 36 holds the mold in this uppermost position for a short period of time, to permit the withdrawal of the pallet and bricks, after which withdrawal the mold descends to its lowermost position, the cross-head 16 continuing to travel upward during the descent of the mold until it reaches its uppermost position, at which period the mold filler is thrown forward and the parts again assume the position shown in Fig. 9. By reason of this manner of delivering the bricks upon the pallet, they are simply left thereon by the uprising mold and plungers without shock or abrading movement, and thereafter withdrawn from the machine on the pallet in perfect condition. The bricks are then carried on the pallet to the drying room or shed and left to set and harden, while a fresh pallet is brought into position to be inserted in the machine to receive the next discharge of bricks.

The bricks may be made thinner or thicker by adjusting the cross-block upward or downward upon the adjusting screws, to cause the bottom plungers to enter more or less into the mold forms; and the distance between the top and bottom plungers, when the top plungers are in their lowermost position, will be governed by adjusting the nuts on the tension rods 15 to move the cross-head 16 toward or away from the toggle blocks 14. The degree of compression will also be governed by this adjustment of the cross-head upon the tension rods and the position of the bottom plungers in the mold forms.

While I have described my machine as especially adapted for making bricks in conformity with my aforesaid patented process, it may be adapted, by suitably changing the mold forms and plungers, to manufacture various kinds of bricks and blocks from mixtures of sand and cement, sand and lime, asphalt, or other concrete compositions; and said bricks or blocks may be made either plain, or with ornamental surfaces, and either solid or hollow, as may be required. In this manner, bricks or blocks of many forms may be manufactured for building purposes, for street paving, sewers, etc., also tiling for floors, walls and roofing. Moreover, while I have shown the machine adapted to produce four bricks or blocks at each operation, it will be understood that it may be constructed to form a greater or less number, by making suitable changes in the mold and plungers; also, instead of manipulating the pallet by hand, in inserting and removing it from the mold, I may arrange the machine to do this automatically.

Without, therefore, confining myself strictly to the construction of the various parts of the machine as herein illustrated and described, what I claim as my invention and desire to secure by Letters-Patent is:

1. A machine of the type described, comprising a mold and bottom and top plungers, in combination with means for operating the mold and plungers relatively to one another, whereby, after the bricks or blocks have been formed in the mold, they will be delivered from the bottom thereof, means whereby a pallet, or other conveying device, may be inserted below the mold after separation is effected between the mold and the bottom plunger, and means for causing the pallet, or other conveyer, to contact with the contents of the mold as they begin to issue therefrom and to maintain said contact while delivery is taking place.

2. A machine of the type described, comprising a bottom plunger, a mold adapted to be raised and lowered with respect thereto, a reciprocating top plunger, means for positioning the mold to enter the bottom plunger therein, means for actuating the top plunger to enter it into the mold when so positioned, means for raising the mold in conjunction with the top plunger and for imparting movement to the mold faster than to said plunger, whereby the contents of the mold will be delivered from the bottom of the mold, means whereby a pallet, or other conveyer, may be inserted below the mold and means for raising the pallet or other conveyer in contact with the bottom of the mold until contact is made between the pallet and the contents of the mold, and for maintaining the contact with said contents while delivery is taking place.

3. A machine of the type described, comprising a stationary bottom plunger, a mold adapted to be raised and lowered with respect thereto, a reciprocating top plunger, means for positioning the mold to enter the bottom plunger therein, means for actuating the top plunger to enter it into the mold when so positioned, means for raising the mold in conjunction with the top plunger to permit the insertion of a pallet or other conveyer below the mold, means for imparting a movement to the mold faster than that of the upward stroke of the reciprocating plunger, whereby the contents of the mold will be delivered from the bottom of the mold, and means for causing the pallet, or other conveyer, to contact with the mold contents and to thereafter follow their upward travel until said contents have been fully delivered from the molds.

4. In a machine of the type described, the combination, with the stationary and reciprocating plungers and the cam actuated mold adapted to have said plungers entered therein from below and above and to operate in conjunction with the reciprocating plunger or plungers to discharge the contents of the mold therefrom, of a pallet-rack, or guide, movably mounted below the mold, means for causing said rack to follow the upward movements of the mold and its contents until said contents have been discharged therefrom, and means for arresting the rack in its upward movement after said discharge.

5. In a machine of the type described, the combination, with the movable mold, of a pallet-rack, or guide, bearing against the bottom of the mold, vertical rods slidably mounted in the machine frame and supporting the rack, weighted levers engaging said rods to cause the rack to follow the upward movement of the mold and its contents, and stops on the rods to limit the upward movement of the rack when the mold has discharged its contents.

6. A machine of the type described comprising a pair of standards spaced apart and provided with vertical guide-ways, a cross-block carrying a bottom plunger or plungers mounted in a fixed position in said standards, a toggle hung from the under side of said block, toggle blocks mounted to reciprocate in the lower portion of the guide-ways, a cross-head carrying a top plunger or plungers mounted to reciprocate in the upper portion of the guide-ways, tension rods joining the cross-head to the toggle blocks, a mold mounted to reciprocate in the guide-ways above the cross-block, a crank shaft coupled to the toggle to impart motion to the cross-head, a cam on said shaft, a cam lever and connections whereby motion is imparted from said cam to the mold to raise the mold at the same time with the up stroke of the cross-head and to impart a more rapid motion to the mold relatively to the cross-head during a portion of said stroke to cause the top plunger or plungers to discharge the contents of the mold therefrom, and means for imparting motion to the crank shaft.

7. In a machine of the type described, the combination with a movable mold and a reciprocating cross-head carrying one or more top plungers, said mold and cross-head being guided at each end in guide-ways provided therefor in upright standards, of a cross-block carrying one or more stationary bottom plungers positioned below the mold and having its ends slidably mounted in said guide-ways, adjusting screws rising from the standards below the cross-block and engaging the ends thereof, whereby the cross-block may be raised and lowered and rigidly fastened in order to properly position the bottom plunger or plungers with relation to the mold, a toggle hung from the under side of said cross-block, connections between said toggle and the reciprocating cross-head and means for imparting motion to the toggle and to the mold substantially as herein set forth.

8. In a machine of the type described, the combination with a mold and top and bottom plungers, of a mold filler adapted to slide over the top of the mold when said parts are in position for charging the mold, a cam wheel mounted upon a driving shaft, said cam wheel having a circular periphery provided at one point in its circumference with a recess substantially as described, a feed lever engaging the periphery of said wheel, a feed shaft upon which said lever is mounted, a weighted lever attached to said shaft to hold the feed lever in contact with the cam wheel and to actuate the mold filler in one direction when the feed lever enters the recess in said wheel, and a throw lever, or levers, attached to the feed shaft and coupled to the mold filler.

In testimony whereof I have affixed my signature, in presence of two witnesses.

ORVIS G. DIEFENDORF.

Witnesses:
WM. F. DONLEY,
CHAS. DONLEY.